(12) United States Patent
Korsgaard et al.

(10) Patent No.: US 11,380,914 B2
(45) Date of Patent: Jul. 5, 2022

(54) FUEL CELL SYSTEM AND METHOD FOR ITS OPERATION

(71) Applicant: fischer Eco Solutions GmbH, Achern-Fautenbach (DE)

(72) Inventors: Anders Risum Korsgaard, Aalborg (DK); Mads Bang, Skorping (DK); Morten Hougaard Sørensen, Gistrup (DK)

(73) Assignee: fischer Eco Solutions GmbH, Achern-Fautenbach (DE)

( * ) Notice: Subject to any disclaimer, the term of this patent is extended or adjusted under 35 U.S.C. 154(b) by 21 days.

(21) Appl. No.: 16/970,001

(22) PCT Filed: Feb. 14, 2019

(86) PCT No.: PCT/DK2019/050049
§ 371 (c)(1),
(2) Date: Aug. 14, 2020

(87) PCT Pub. No.: WO2019/158173
PCT Pub. Date: Aug. 22, 2019

(65) Prior Publication Data
US 2021/0104755 A1    Apr. 8, 2021

(30) Foreign Application Priority Data

Feb. 16, 2018    (DK) .......................... PA 2018 70093

(51) Int. Cl.
*H01M 8/04*        (2016.01)
*H01M 8/04007*     (2016.01)
(Continued)

(52) U.S. Cl.
CPC ... *H01M 8/04059* (2013.01); *H01M 8/04014* (2013.01); *H01M 8/04302* (2016.02); *H01M 8/04776* (2013.01)

(58) Field of Classification Search
CPC ......... H01M 8/04014; H01M 8/04059; H01M 8/04302; H01M 8/04776
(Continued)

(56) References Cited

U.S. PATENT DOCUMENTS 4,670,359 A    6/1987 Beshty
6,390,030 B1   5/2002 Isogawa
(Continued)

FOREIGN PATENT DOCUMENTS

JP    H01186761 A    7/1989
WO   2013161470 A1  10/2013
(Continued)

*Primary Examiner* — James M Erwin
(74) *Attorney, Agent, or Firm* — James Creighton Wray

(57) ABSTRACT

A fuel cell system (1) comprising a fuel cell (2), a liquid fuel supply (3) for providing liquid fuel, an evaporator (6) for evaporating the liquid fuel to fuel vapor, a reformer (7) for catalytic conversion of the fuel vapor to syngas for the fuel cell and a burner (8) for heating the reformer (7). The burner (8) comprises a catalytic monolith (21) down-stream of a mixing chamber (31) in which air is mixed with evaporated fuel or rest gas prior to entering the monolith (21). The mixing chamber (31) is surrounded by a sleeve (23), which comprises a plurality of openings (29A, 29B) around the mixing chamber (31) for supply of fuel vapor through the openings (29A, 29B) in the startup phase and for supply of rest gas through the openings (29A, 29B) during normal operation. Optionally, a heat exchanger (17) is provided between the burner (8) and the reformer (7) for reducing the temperature of the exhaust gas from the burner (8) before it reaches the reformer (7). This temperature reduction prevents degradation of the reformer (7) by hot exhaust gas during start-up of the fuel cell system (1).

20 Claims, 7 Drawing Sheets

(51) Int. Cl.
   *H01M 8/04302* (2016.01)
   *H01M 8/04014* (2016.01)
   *H01M 8/04746* (2016.01)

(58) Field of Classification Search
   USPC .......................................................... 429/429
   See application file for complete search history.

(56) References Cited

U.S. PATENT DOCUMENTS

| | | |
|---|---|---|
| 2004/0115494 A1 | 6/2004 | Tamura |
| 2014/0227619 A1 | 8/2014 | Yoshimine |
| 2014/0287332 A1 | 9/2014 | Yoshimine |
| 2015/0044589 A1* | 2/2015 | Yamamoto ............ F28D 7/1669 |
| | | 429/425 |
| 2015/0311553 A1* | 10/2015 | Dohkoshi ......... H01M 8/04074 |
| | | 429/410 |
| 2015/0380756 A1 | 12/2015 | Orishima |
| 2016/0006062 A1* | 1/2016 | Rechberger ......... H01M 8/0618 |
| | | 122/31.1 |
| 2017/0222240 A1 | 8/2017 | Korsgaard |

FOREIGN PATENT DOCUMENTS

| | | |
|---|---|---|
| WO | 2013187154 A1 | 12/2013 |
| WO | 2014167908 A1 | 10/2014 |
| WO | 2016008486 A1 | 1/2016 |
| WO | 2017121431 A1 | 7/2017 |
| WO | 2017207004 A1 | 12/2017 |

\* cited by examiner

FUEL CELL SYSTEM AND METHOD FOR ITS OPERATION

This application claims the benefit of Danish Application No. PA 2018 70092 filed Feb. 16, 2018 and PCT/DK2019/050049 filed 14 Feb. 2019, International Publication No. WO 2019/158173 A1 published Aug. 22, 2019, which are hereby incorporated by reference in their entirety as if fully set forth herein.

FIELD OF THE INVENTION

The present invention relates to a fuel cell system and method for operating the fuel cell system. In particular, it relates to use of a combination of a burner and reformer in the fuel cell system, where the exhaust gas of the burner is used for heating the reformer.

BACKGROUND OF THE INVENTION

Fuel cell systems generate heat as a by-product when generating electricity. This heat is removed by cooling-liquid that circulating through channels in the fuel cell, where the flow of cooling-liquid through heat exchangers and radiators is adjusted to keep the fuel cell at a steady temperature for optimized operation. The cooling liquid is advantageously used for heating the fuel cells during startup conditions.

WO2016/008486 by the same applicant discloses a compact fuel cell system comprising a fuel cell stack alongside a burner/reformer combination. The exhaust gas of the burner is passed along the reformer and heats it in order for the reformer to reach a temperature necessary for its production of syngas from evaporated fuel. Once, the exhaust gas from the burner has passed the reformer, it transfers heat to a heat exchanger module downstream of the reformer. The heat exchanger module comprises a radiator for transfer of thermal energy to the cooling liquid in the cooling system for heating it in startup situations where the fuel cell stack shall be activated quickly.

Although, this system is advantageous especially in startup situations, there is a need for further improvements.

Various other fuel cell systems are disclosed in patent documents WO2013/161470, WO2013/187154, US2014/287332, US2014/227619, EP2984695, and U.S. Pat. No. 4,670,359.

Despite the improvements suggested by these disclosures, there is a steady need for improvement of the efficiency of fuel cell systems. Especially, there is a need for better control of the operation of a fuel cell during startup as well as normal electricity-producing operation.

DESCRIPTION OF THE INVENTION

It is the objective of the invention to provide an improvement in the art. Especially, it is an objective to provide a fuel cell system with improved control of the operation. It is a further objective to improve the start-up conditions of the fuel cell system. In particular, it is an objective to optimize the use of the burner in start-up conditions. These objectives are obtained with systems and methods as explained in more detail in the following.

The fuel cell system comprises a fuel cell, a liquid fuel supply for providing liquid fuel, an evaporator for evaporating the liquid fuel to fuel vapor, a reformer for catalytic conversion of the fuel vapor to syngas for use in the fuel cell. Further, a burner is provided, the gas exhaust of which is in flow-communication with the reformer through an exhaust gas flow path for heating the reformer by the exhaust gas.

In practical embodiments, the burner comprises a catalytic monolith which is arranged in extension and downstream of a mixing chamber in which air and evaporated fuel or rest gas is mixed prior to entering the monolith.

Advantageously, the mixing chamber is surrounded by a sleeve, which comprises a plurality of openings around the mixing chamber for supply of fuel vapour or rest gas through the openings.

Optionally, the openings are not extending through the sleeve perpendicularly to the sleeve surface but are inclined in a direction towards the monolith for creating a flow of the rest gas or the fuel vapour towards to the monolith. This has been found advantageous for optimizing the mixing.

As an option, the sleeve comprise two sets of openings, each set being distributed in a plane perpendicular to a longitudinal axis of the sleeve, where the plane of the first set of openings has a distance to the plane of the second set of openings. The first set of openings is used for fuel vapour in the start-up phase and the second set of openings is used for rest gas in the normal operation of the fuel cell system.

Optionally, the system is configured so that the first set of openings is used only for transport of fuel vapor into the mixing chamber, for example solely or primarily during the start-up phase. Optionally, alternatively or in addition, the system is configured so that the second set of openings is used only for transport of rest gas into the mixing chamber, for example solely or primarily during normal operation of the fuel cell system.

Optionally, in order to adjust the mass flow for the start-up phase as compared to the normal operation of the fuel cell, the number or size of the openings in the first set of openings is different from the number or size of openings in the second set of openings. For example, the openings in the two sets have the same size, but there are more openings in the second set of openings. By this arrangement of different sets of openings, a controlled and stable predetermined flow is achieved with very simple but efficient means.

The sleeve with its technical features has resulted in better control of the operation of the fuel cell system, especially the mixing of the air with fuel vapour and rest gas.

Before going into detail with further practical embodiments of the invention, the following discussion is useful for understanding further of the advantages of the invention. During start-up of the fuel cell system, a quick rise in temperature is desired, which in turn requires aggressive use of the burner and high temperature of the exhaust gas. This is to a certain extent advantageous in that efficient use of the burner at high temperature implies so-called clean burning. However, the inventors have realized that during optimum burning in start-up situations, the temperature of the exhaust gas may become so high that there is a risk for degradation of the reformer by the heat of the exhaust gas. Accordingly, there must be found a balance between the efficiency of the burner and the temperature of the exhaust gas that reaches the reformer. However, instead of the straightforward technical solution of reducing the efficiency of the burner by increased air flow, which in turn decreases the temperature of the exhaust gas, the inventors have found a better, but still simple solution to the problem, which results in efficient use of the burner while at the same time avoiding degradation of the reformer.

The simple solution implies provision of a heat exchanger in the exhaust gas flow path between the burner and the reformer for reducing the temperature of the exhaust gas from the burner before the exhaust gas reaches the reformer.

By providing an exhaust gas heat exchanger between the burner and the reformer, most of the thermal energy of the exhaust gas from the burner is efficiently removed by the exhaust gas heat exchanger before the exhaust gas reaches the reformer, which protects the reformer and at the same time efficiently transfers the thermal energy to other components in the fuel cell system, especially to the fuel cells. It is pointed out that a heating of the reformer is only required during normal operation, so that most of the heat from the exhaust gas is advantageously transferred to the fuel cell during start-up.

By allowing a higher temperature of the exhaust gas, the air flow through the burner can be reduced, which results in better burning than at typical airflows used in the prior art where increased air flow is used to prevent overheating of the reformer.

The term fuel cell in the fuel cell system is used here for simplicity and has to be understood as also implying a plurality of fuel cells, for example a fuel cell stack. Typically, the fuel cells in the stack are interconnected to share a common cooling circuit.

For example, the fuel cell is high temperature proton exchange membrane fuel cell, also called high temperature proton electrolyte membrane (HTPEM) fuel cell, which operates above 120 degrees centigrade, differentiating the HTPEM fuel cell from low temperature PEM fuel cells, the latter operating at temperatures below 100 degrees, for example at 70 degrees. The operating temperature of HTPEM fuel cells is the range of 120 to 200 degrees centigrade, for example in the range of 160 to 170 degrees centigrade. The electrolyte membrane in the HTPEM fuel cell is mineral acid based, typically a polymer film, for example polybenzimidazole doped with phosphoric acid.

When using liquid fuel, hydrogen for the fuel cell is generated by conversion of the liquid fuel into a synthetic gas, called syngas, containing high amounts of gaseous hydrogen. An example of liquid fuel is a mixture of methanol and water, but other liquid fuels can also be used, especially, other alcohols, including ethanol. For the conversion, the liquid fuel is evaporated in an evaporator, after which the fuel vapour is catalytically converted to syngas in a reformer prior to entering the fuel cell. HTPEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, for example for automobile industry.

For receiving the liquid fuel, the evaporator has an upstream liquid conduit to the liquid fuel supply and is configured for evaporating the liquid fuel to fuel vapour which is then fed into the reformer through a vapour conduit between the downstream side of the evaporator and the upstream side of the reformer. In addition, the reformer has a downstream syngas conduit to the fuel cell through which syngas is provided to the fuel cell.

In order to reach the temperature relevant for the conversion process in the reformer, for example around 280 degrees centigrade, the burner is employed during normal operation of the fuel cells. For example, the exhaust gas of a burner is used for heating the walls of the reformer, typically by flow of the hot exhaust gas along the outer walls of the reformer. Advantageously, the outer walls of the reformer are provided with thin metal vanes or fins in order to ensure a good transfer of thermal energy between the exhaust gas and the wall of the reformer. The wall of the reformer is made from a good heat conductor, for example aluminum. Examples of useful extruded compact reformers are disclosed in WO2017/121431 and WO2017/207004 by the applicant.

In practical embodiments, an upstream liquid-conduit is connected to the liquid fuel supply for provision of the liquid fuel from the liquid fuel supply to the evaporator. Further, a vapor-conduit is connected to the reformer for providing the fuel vapor from the evaporator to the reformer. A syngas-conduit from the reformer to the fuel cell provides syngas from the reformer to the fuel cell.

During start-up of the fuel cell system, evaporated fuel and air are provided to the burner and catalytically burned for providing hot exhaust gas. The thermal energy is transferred to cooling liquid in the exhaust gas heat exchanger. From the cooling liquid, thermal energy is transferred to the fuel cell for heating the fuel cell by the thermal energy in order to reach a temperature for production of electricity.

The system is configured for switching from the start-up condition to a normal operation of the fuel cell, once the proper temperature of the system is reached. During the normal operation, rest gas from the fuel cell is provided to the burner, which catalytically burns the rest gas to provide hot exhaust gas, the thermal energy of which is transferred to the reformer.

Optionally, the exhaust gas heat exchanger may also be used for decreasing the temperature of the exhaust gas during normal operation, although typically, this will not be the case as the entire heat of the exhaust gas is used to heat the reformer.

A cooling-liquid circuit is provided for cooling the fuel cell by cooling-liquid. The cooling-liquid circuit comprises a primary heat exchanger configured for cooling of the cooling-liquid prior to entering the fuel cell. For example, the primary heat exchanger comprises an air blown cooler configured for blowing air on the cooler for transfer of heat from the cooling-liquid in the primary heat exchanger to the air.

In some embodiments, the cooling circuit comprises a primary cooling circuit for cooling the fuel cell by cooling-liquid from the primary cooling circuit. The primary heat exchanger is thus provided in the primary cooing circuit and configured for cooling of the cooling-liquid prior to entering the fuel cell. Further, the fuel cell system comprises a secondary cooling circuit through the exhaust gas heat exchanger for transfer of heat from the exhaust gas to cooling liquid in the secondary cooling circuit. For normal operation, the primary and the secondary cooling circuits need not necessarily be thermally coupled but can be functioning independently from each other. However, for the start-up phase, where heat is transferred from the exhaust gas to the fuel cell, it is advantageous if the primary cooling circuit and the secondary cooling circuit are in thermal connection with each other, for example through a secondary heat exchanger or even in flow-connection with each other such that they are sharing cooling liquid.

A compact solution has been found by the burner and the exhaust gas heat exchanger being in abutment with each other to form a compact burner module.

Useful examples of compact fuel cell systems for use where space is an issue are given in WO2016/008486, -87, and -88. Such general configurations are also possible in connection with the invention.

The special configuration of the sleeve with the two sets of openings is an invention independent of the exhaust gas heat exchanger presented herein but is advantageously combined therewith.

It is for sake of clarity pointed out here that all temperatures herein are given in degrees centigrade.

SHORT DESCRIPTION OF THE DRAWINGS

The invention will be explained in more detail with reference to the drawing, where FIG. 1 illustrates a flow diagram for a fuel cell system with a cooling circuit;

FIG. 4a-j illustrate alternative flow diagrams.

DETAILED DESCRIPTION/PREFERRED EMBODIMENT

Figure 1:
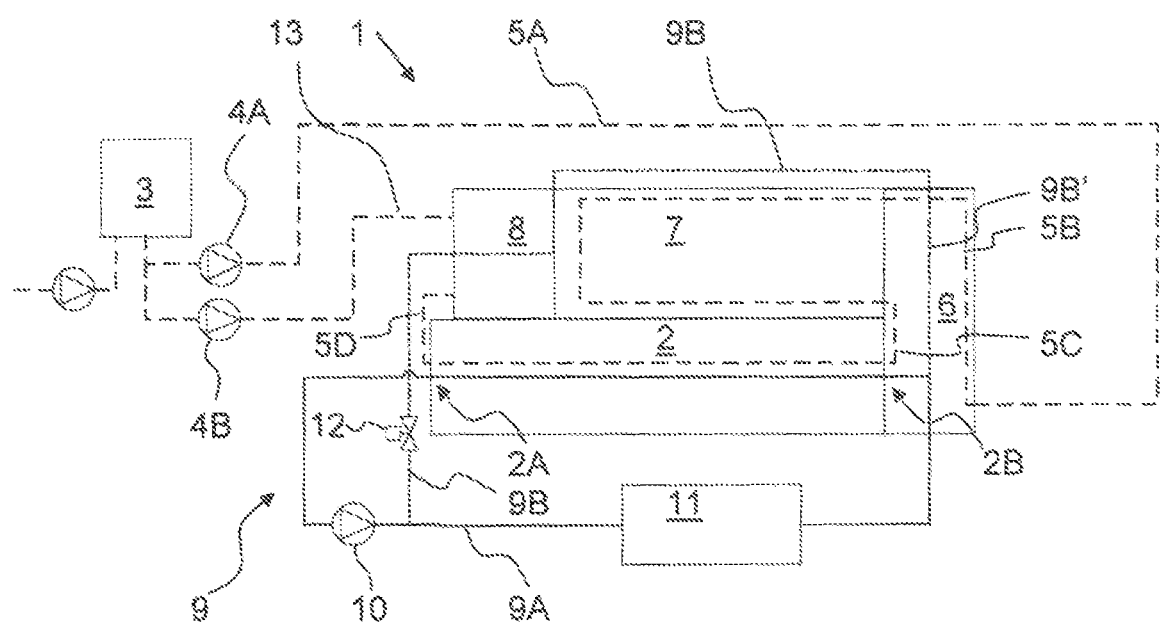

FIG. 1 illustrates a fuel cell system 1 that comprises a fuel cell, for example a fuel cell stack 2, for which liquid fuel, for example a mixture of methanol and water is supplied from the fuel supply tank 3. Liquid fuel from the fuel tank 3 is pumped by a first fuel pump 4A through a liquid conduit 5A into the evaporator 6, in which the temperature of the liquid fuel is raised in the fuel heat exchange conduit 5B until evaporation of the fuel. The vapour is fed into a reformer 7 that converts the vapour catalytically into syngas, for example by using a catalyser, optionally comprising copper. Syngas mainly consist of hydrogen and carbon dioxide and a small content of water mist and carbon monoxide. The syngas is supplied through a syngas conduit 5C into the fuel cell stack 2 anode side of the proton electrolyte membranes, while oxygen, typically from air, is supplied to the cathode side of the proton electrolyte membranes.

In order to reach the temperature relevant for the conversion process in the reformer 7, for example around 280 degrees centigrade, a burner module 8 is employed, using anode rest gas from the fuel cell stack 2 for burning. The rest gas is supplied from the fuel cell stack 2 to the burner module 8 through rest gas conduit 5D. For example, from the burning of the rest gas, the exhaust gas of the burner 8 has a temperature of 350-400 degrees centigrade and is used for heating the walls of the reformer 6, typically by guiding the exhaust gas along an outer wall of the reformer 6.

A cooling circuit 9 is employed for control of the temperature of the fuel cell stack 2. The cooling circuit 9 comprises a primary circuit 9A containing a cooling pump 10 that is pumping cooling liquid from the exit portion 2A of the fuel cell stack 2 through a primary heat exchanger 11 and then through the fuel cell stack 2 for adjustment of the temperature of the cooling liquid and the fuel cell stack 2, for example a temperature in the range of 120 to 200 degrees centigrade, for example at 170 degrees centigrade. The latter is a typical temperature for a high temperature PEM fuel cell stack.

The cooling circuit 9 comprises a secondary cooling circuit 9B than branches off the primary cooling circuit 9A and guides the cooling liquid from the primary cooling circuit 9A through a flow adjustment valve 12 and by a cooling-liquid heat exchange conduit 9B' through the evaporator 6. The cooling-liquid heat exchange conduit 9B' is in thermal connection with the fuel heat exchange conduit 5B for transfer of heat from the cooling-liquid to the liquid fuel for evaporation thereof, which causes a drop in the temperature of the cooling liquid in the secondary circuit which then mixes with the cooling liquid from the primary liquid circuit prior to entering the entrance 2B of the fuel cell stack 2. The correct temperature is controlled by using the primary heat exchanger 11 in the primary cooling circuit 9A. For example, the temperature of a high temperature PEM fuel cell stack is 170 degrees centigrade, and in the evaporator 6 the temperature drops close to 160 degrees, which is the temperature needed at the entrance of the fuel cell stack 2. Typically, only minor adjustments of the temperature of the cooling liquid are necessary for precise control of the cooling-liquid temperature at the entrance 2b of the fuel cell stack 2.

As illustrated in FIG. 1, the secondary cooling circuit 9B also guides the cooling liquid through the burner module 8. This is important for start-up situations, where it is desired that the fuel cell system 1 is attaining the correct operation temperature quickly. For this reason, the burner module 8 is used in the start-up phase for not only heating the reformer 7 but also for heating the cooling liquid in the secondary cooling circuit 9B. For the heating, the burner module 8 receives liquid fuel from the fuel tank 3 through a second fuel pump 4B and fuel pipe 13. The liquid fuel is evaporated in a burner-evaporator unit inside the burner module 8, which will be explained in more detail below.

It is pointed out that the guidance of the cooling liquid in the secondary cooling circuit 9B through the burner module 8 is optional for the case of the normal, electricity producing operation of the fuel cell stack 2, and the secondary cooling circuit 9B could readily be modified to switch from the start-up mode, where the cooling liquid is guided through the burner module 8, to a normal operation mode where the cooling liquid is bypassing the burner module 8, similar to the illustrated bypass of the secondary cooling circuit 9B around the reformer 7.

In some systems, however, it may be advantageous to maintain a guidance of cooling liquid through the burner module 8 also during normal operation of the fuel cell stack 2 due to the fact that the burner 8 has a tendency to provide exhaust gas that is too hot for the reformer 7 such that a cooling of the exhaust gas from the burner module 8 is desired before it is used to heat the reformer 7.

Figure 2A:
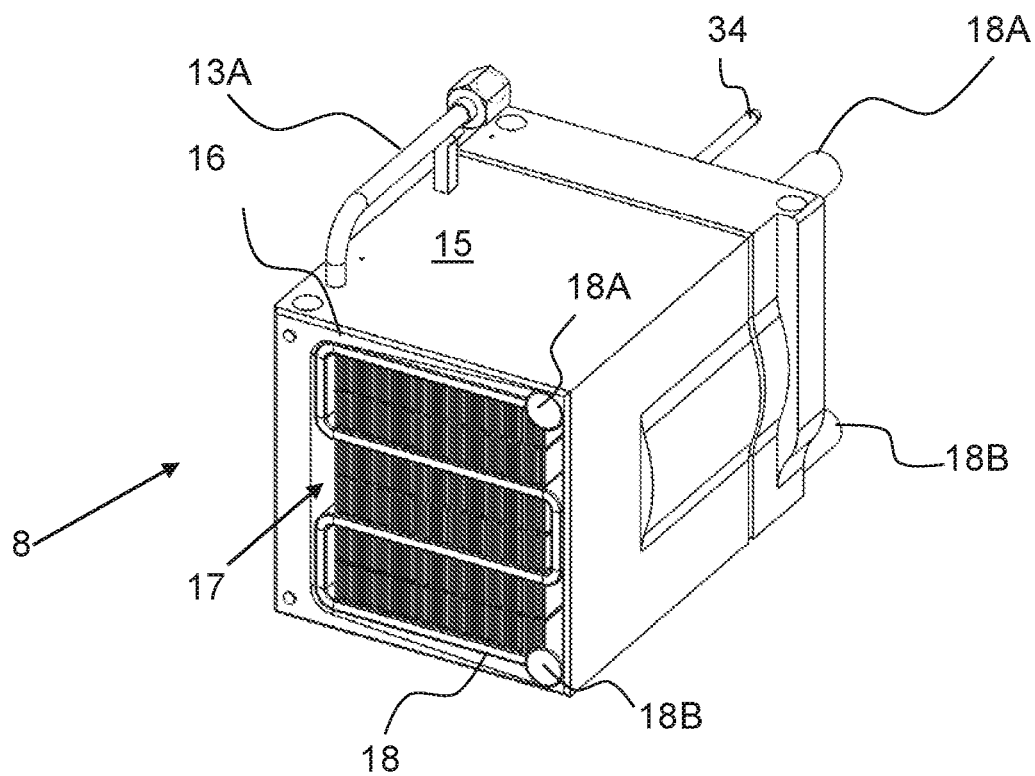
FIG. 2 is a drawing of a burner module in a) assembled state and b) exploded view.

An example of a burner module 8 is explained with reference to FIG. 2. FIG. 2a illustrates the burner module 8 in assembled state and FIG. 2b in exploded view. A tube connector 13A receives liquid fuel from the fuel pipe 13 of FIG. 1. In evaporated form and mixed with air from an air supply 14, the fuel enters the burner module 8 and is catalytically burned for providing heat. In start-up situation, the burner housing 15 can also be pre-heated by an electrical heating element (not shown) which is inserted into a canal 16 in the housing 15. The exhaust gas that is produced during the burning of the fuel exits the burner module 8 through an exhaust gas heat exchanger 17. The exhaust gas heat exchanger 17 has a cooling liquid path 18 from cooling liquid entrance 18A to cooling liquid exit 18B. In start-up situations, the exhaust gas heats the cooling liquid in the exhaust gas heat exchanger 17 for heating the fuel cells 2 with the heated cooling liquid.

Optionally, during normal operation of the fuel cell stack 2, the exhaust gas of the burner is cooled by the cooling liquid in order to thermally protect the reformer 7. However, this is normally not necessary.

A pressure probe is used for control of the burner and connected to a probe connector 34.

The burner module 8 comprises a burner evaporator 19, a burner 8' in which the fuel or rest gas is burned as well as the exhaust gas heat exchanger 17. FIG. 2b illustrates the burner module 8 in exploded view in which the exhaust gas heat exchanger 17 separated from the burner 8'. Fuel received through the tube connector 13A is evaporated in a burner evaporator 19 that is included in the wall of the burner module 8 and has thermal contact with the burner chamber 20 from which heat is received. A monolith 21 for catalytic burning of the fuel is provided inside the burner chamber 20. It is surrounded by a packing cylinder 22. The packing cylinder 22 is optionally configured such that it expands slightly when heated, which allows a smooth assembly during production and a firm holding of the monolith when in use. A sleeve 23 surrounds the packing cylinder. The sleeve 23 has a larger length so as to extend beyond the monolith 21 into and around a region 24 in order to form a mixing chamber between the monolith 21 and an air supply module 25. The air supply module 25 receives air from an air inlet 28 and distributes the air outwards along a plurality of vanes 25A into the region 24 in which the air in turbulent form and evaporated fuel or rest gas is mixed for catalytic burning in the monolith 21. Rest gas is received from the fuel cell stack 2 through rest gas stud 26A and into rest gas inlet 26. The cover plate 27 is provided with a corresponding recess 26B.

When liquid fuel is received by the burner module 8 through the tube connector 13A, the liquid fuel enters the burner-evaporator 19. The illustrated burner-evaporator 19 has aspects similar to the burner-evaporator disclosed in WO2016/08488. The liquid fuel is heated when passing over and along a first part 19A of the path through the burner-evaporator, which contains protruding elements, resulting in atomization and partial evaporation of the liquid. A second path 19B, which is serpentine-formed and which provides further heat to the fuel, leads to full vaporization, why the increasing width of the serpentine path is useful. At the end of the serpentine path 19B, the evaporated fuel enters the burner chamber through an opening 19C.

Possible reformers and burner-evaporators are disclosed in WO2016/004886, WO2016/004887, WO2016/004888, and WO2017/207004, all by the applicant. These references also disclose technical solutions for compact fuel cell systems with low weight and small dimensions relatively to the capacity.

Figure 2B:
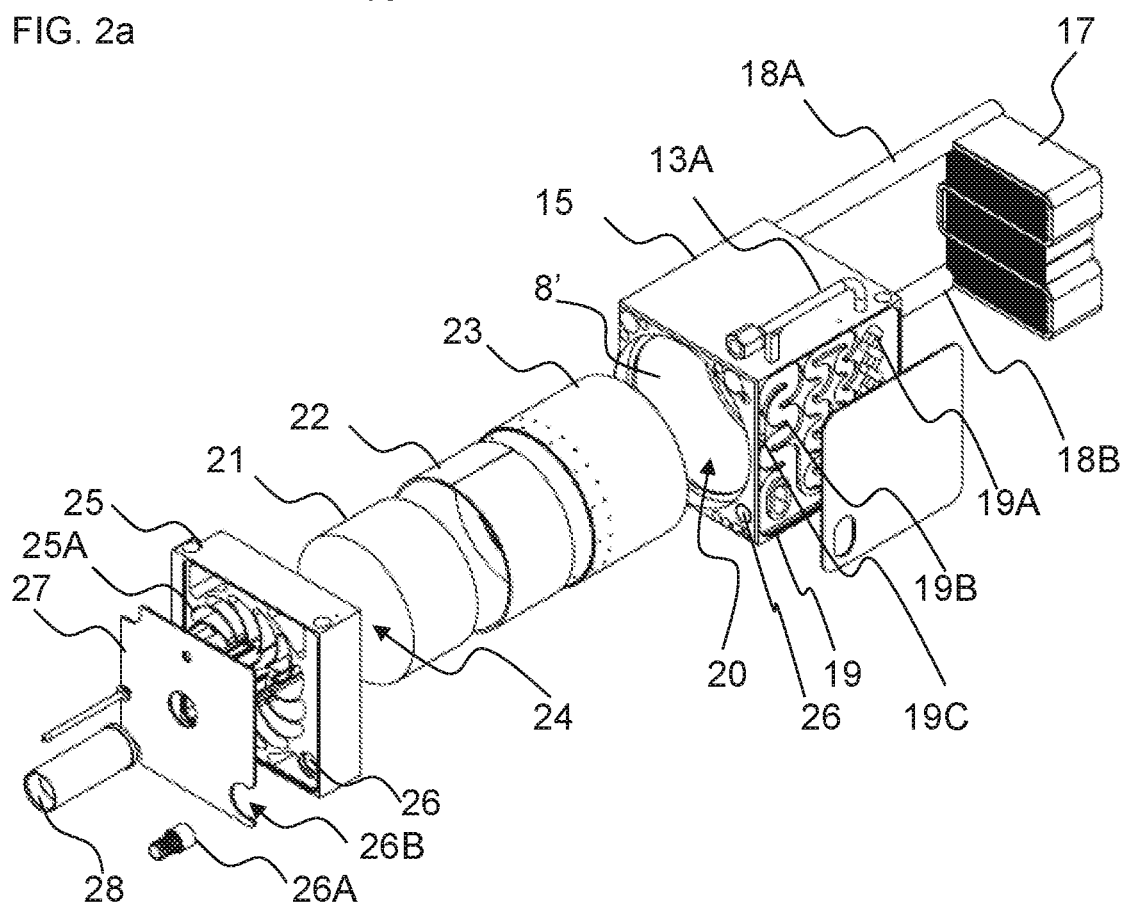
Figure 3:
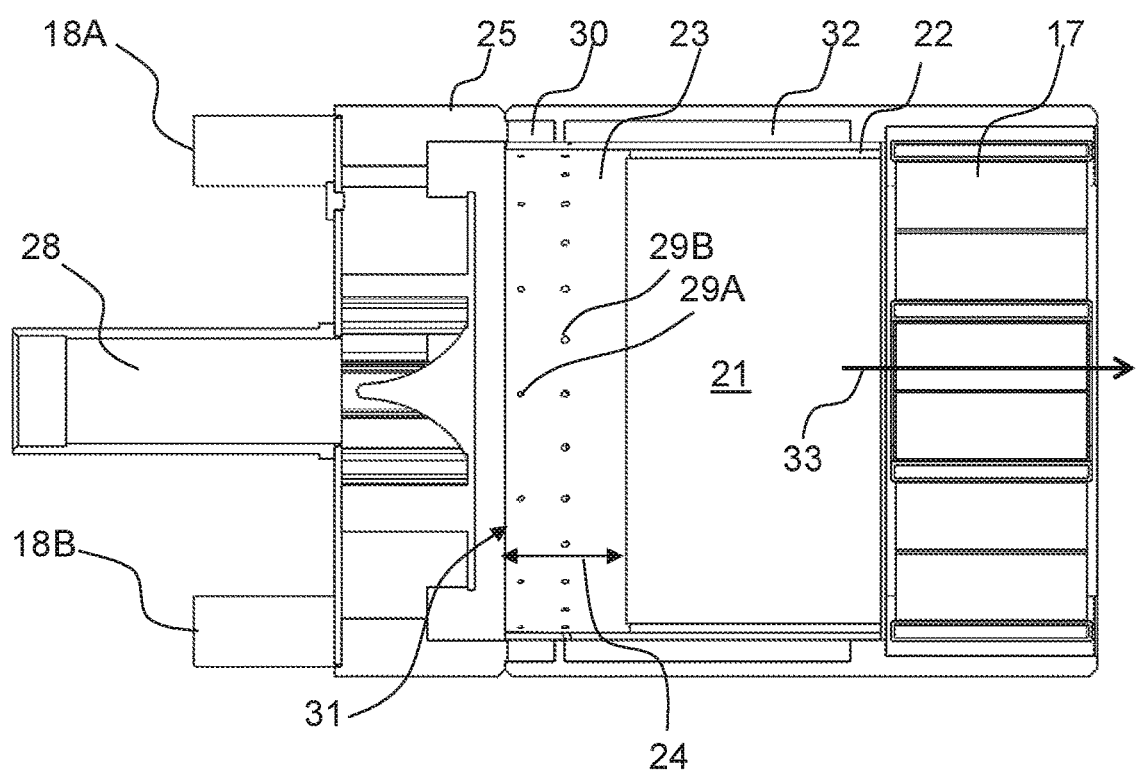
FIG. 3 is a side view drawing, partially in cross section, of the burner module.

The burner 8' is illustrated in partially cross sectional and side view in FIG. 3. Between the monolith 21 and the air supply module 25 is the region 24 which was illustrated in FIG. 2b. This region 24 results in a mixing chamber 31 in which air and fuel or air and rest gas is mixed, depending on whether the conditions are in the start-up phase or the normal operation. For the start-up phase, evaporated fuel is provided from the burner evaporator 19 through opening 19C, see FIG. 2b, through a fuel channel 30, sees FIG. 3, which communicates with a first set of openings 29A for flow of evaporated fuel into the mixing chamber 31 that is within the region 24.

After the start-up, the provision of fuel through the burner-evaporator 19 is stopped, and rest gas is provided from the fuel cell stack 2 through rest gas inlet 26, see FIG. 2b, and into the rest gas channel 32, see FIG. 3. The rest gas channel 32 flow-communicates with a second set of openings 29B of the sleeve 23 for flow of rest gas into the mixing chamber 31 that is within the region 24.

The mixed gas from the mixing chamber 31 enters the monolith 21 for burning of the mix and for production of heat. Along an exhaust gas flow path 33 towards the reformer 7, the exhaust gas from the monolith 21 traverses the exhaust gas heat exchanger 17 for transfer of heat from the exhaust gas to the cooling liquid for warming of the fuel cell system 1 in the start-up phase.

It is observed that the number of the second set of openings 29B is higher than the number of openings in the first set of openings 29A. This is due to an adjustment of the required mass flow into the mixing chamber 31 and from the mixing chamber 31 into the monolith 21, where the mass flow that is required during normal operation is more than in the start-up phase.

Optionally, the openings 29A, 29B are inclined for a flow towards the monolith 21, which has been found advantageous for optimizing the mixing.

FIG. 4 shows some alternatives of the secondary cooling circuit 9B of FIG. 1.

Figure 4A:
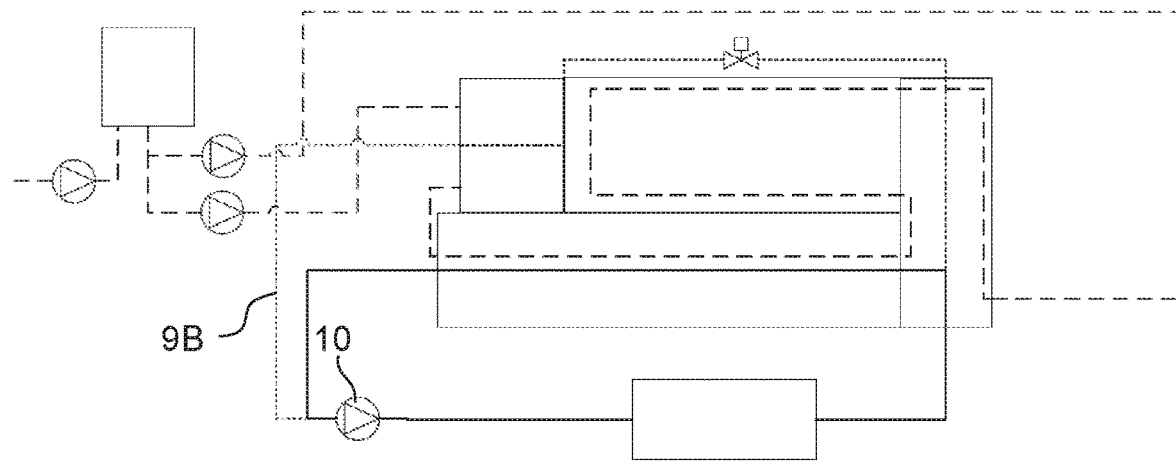

In FIG. 4a, the secondary cooling circuit 9B branches off upstream of the cooling pump 10, resulting in a reverse of the flow of the cooling liquid relatively to the flow in the secondary cooling liquid circuit 9B of FIG. 1.

Figure 4B:
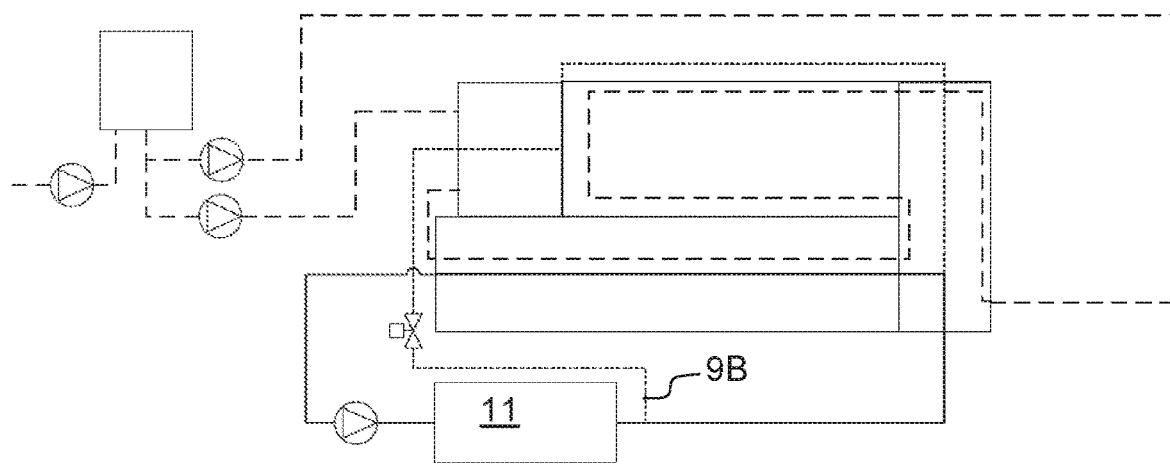

In FIG. 4b, the secondary cooling circuit 9B branches off downstream and not upstream of the primary heat exchanger 11.

Figure 4C:
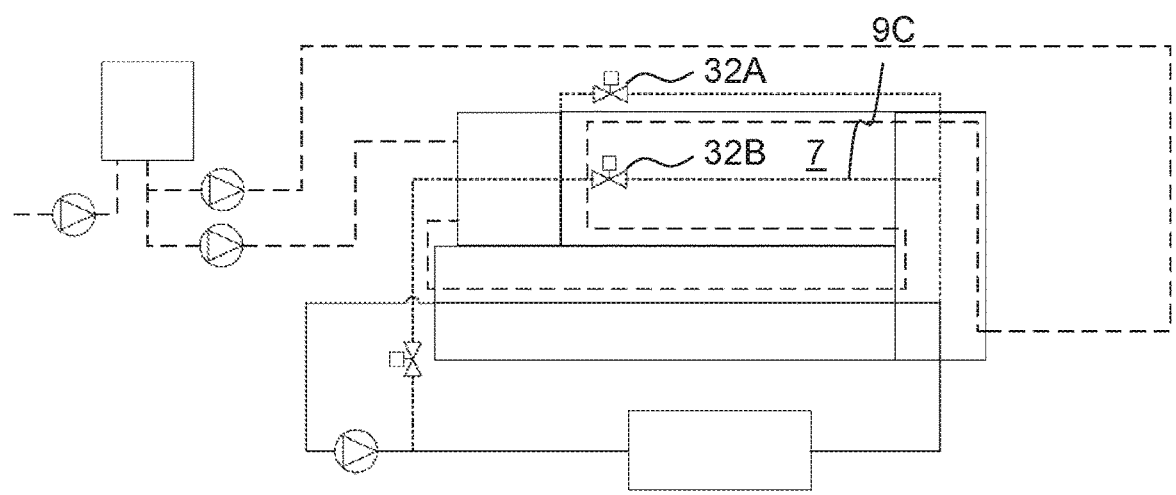

In FIG. 4c, the secondary cooling circuit 9B comprises an additional branch through the reformer 7 for regulating the temperature of the reformer 7, for example cooling of the reformer during start-up for thermal protection. For differential regulation and control, two regulation valves 32A, 32B are provided.

Figure 4D:
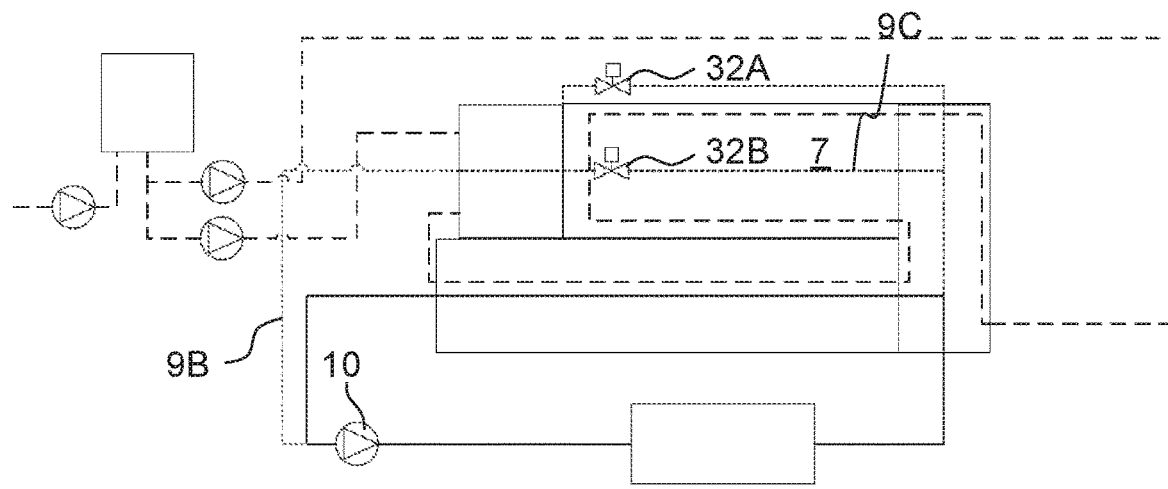

In FIG. 4d, the secondary cooling circuit 9B comprises an additional branch through the reformer 7 for regulating the temperature of the reformer 7. For differential regulation and control, two regulation valves 32A, 32B are provided. Additionally, the secondary cooling circuit 9B is branching off upstream of the cooling pump 10, resulting in a reverse of the flow of the cooling liquid relatively to the flow in the secondary cooling liquid circuit 9B of FIG. 1.

Figure 4E:
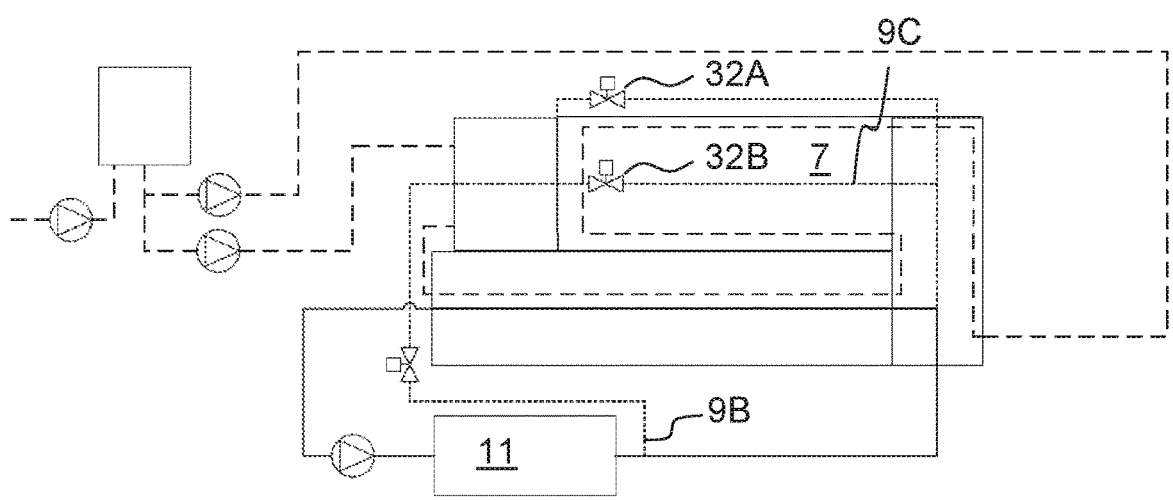

In FIG. 4e, the secondary cooling circuit 9B comprises an additional branch through the reformer 7 for regulating the temperature of the reformer 7. For differential regulation and control, two regulation valves 32A, 32B are provided. Additionally, the secondary cooling circuit 9B is branching off downstream and not upstream of the first heat exchanger 11.

Figure 4F:
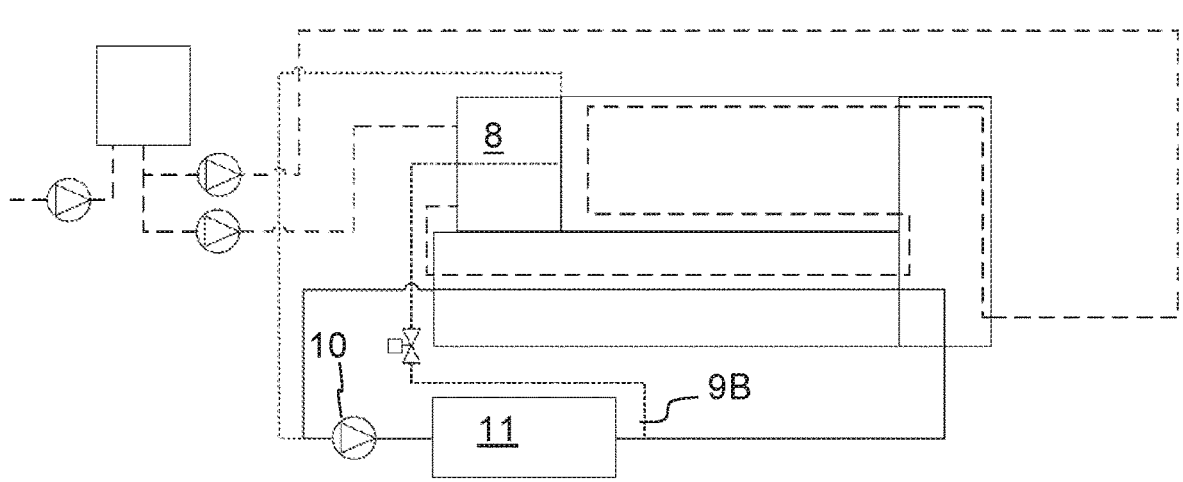

In FIG. 4f, the secondary cooling circuit 9B branches off downstream and not upstream of the primary heat exchanger 11 for flow through the burner module 8, and returns directly from the burner module 8 back to the pump 10.

Figure 4G:
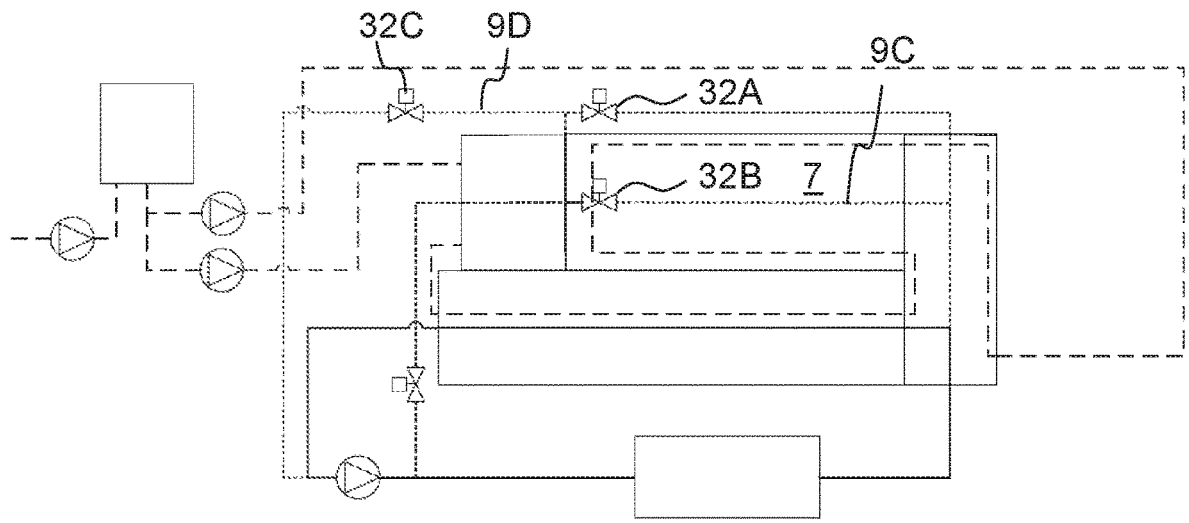

In FIG. 4g, the secondary cooling circuit 9B comprises an additional branch through the reformer 7 for regulating the temperature of the reformer 7. For differential regulation and control, two regulation valves 32A, 32B are provided. Additionally, a return flow conduit 9D back to the pump 10 through an additional regulation valve 32C is provided.

Figure 4H:
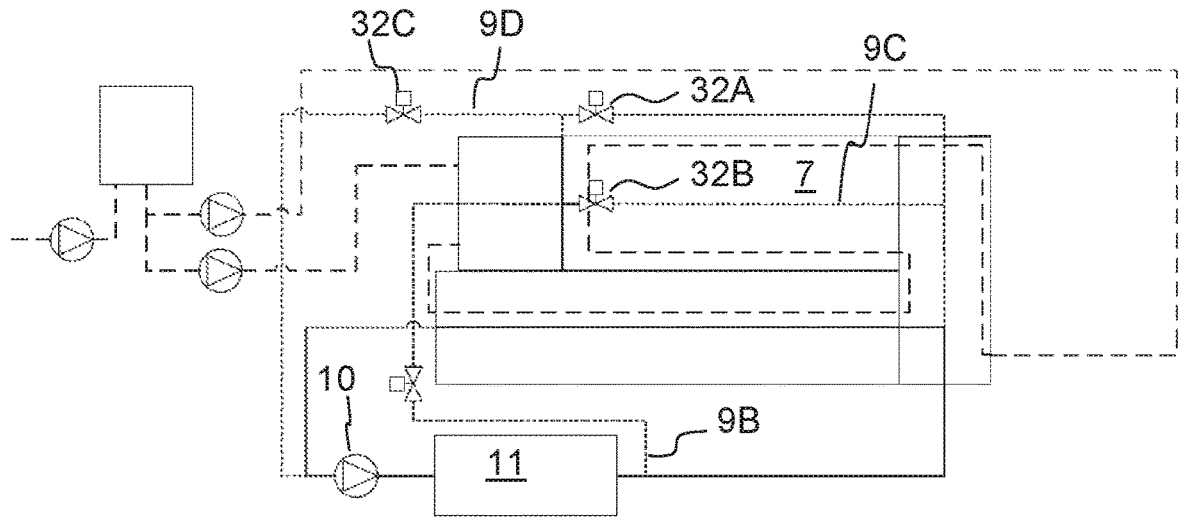

In FIG. 4h, the secondary cooling circuit 9B comprises an additional branch through the reformer 7 for regulating the temperature of the reformer 7. For differential regulation and control, two regulation valves 32A, 32B are provided. Additionally, a return flow conduit 9D back to the pump 10 through an additional regulation valve 32C is provided. The secondary cooling circuit 9B branches off downstream of the primary heat exchanger 11.

Figure 4I:
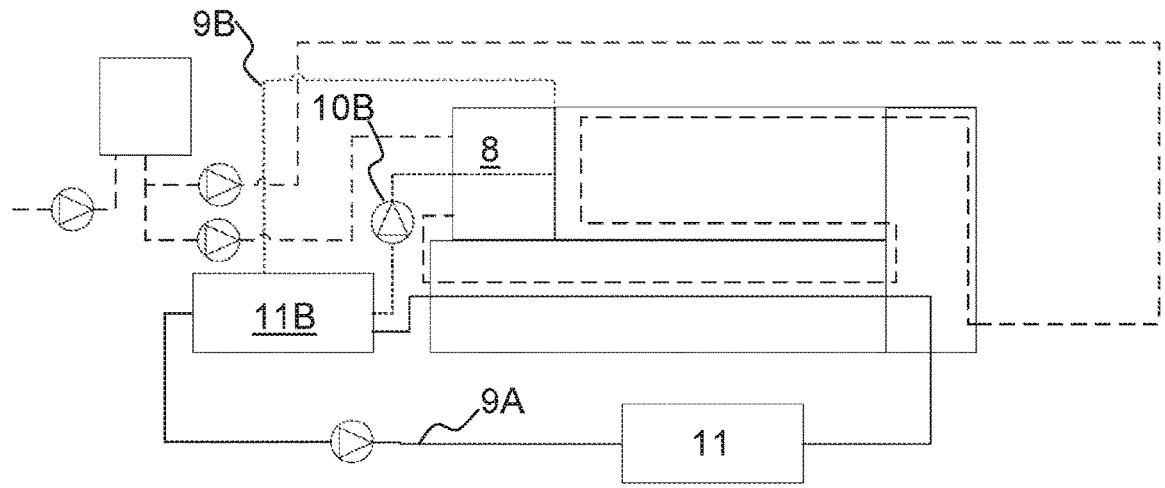

In FIG. 4i, the flow in the primary cooling circuit 9A is separated from the flow in the secondary cooling circuit 9B. Thermal connection for heat transfer between the primary cooling circuit 9A and the secondary cooling circuit 9B is provided through a secondary heat exchanger 11B. Flow in the secondary cooling circuit 9B is caused by a secondary cooling pump 10B such that the cooling liquid flows from the secondary cooling pump 10B through the burner module 8 and then to the secondary heat exchanger 11B.

Figure 4J:
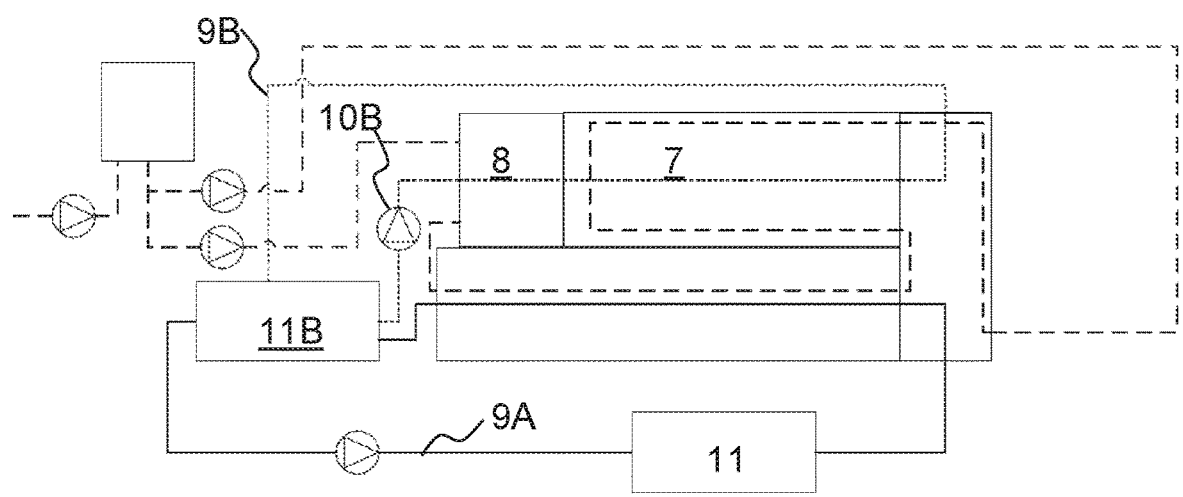

In FIG. 4j, the flow of cooling liquid in the primary cooling circuit 9A is separated from the flow of cooling liquid in the secondary cooling circuit 9B. Thermal connection for heat transfer between the primary cooling circuit 9A and the secondary cooling circuit 9B is provided through a secondary heat exchanger 11B. Flow in the secondary cooling circuit 9B is caused by a secondary cooling pump 10B such that the cooling liquid flows from the secondary cooling pump 10B through the burner module 8, then through the reformer 7, and then to the secondary heat exchanger 11B.

As an example, the following parameters apply. For a HTPEM stack delivering 5 kW, typical dimensions are 0.5 m×0.25 m×0.14 m. For example, the entire fuel cell stack with burner, evaporator and reformer have a weight of around 20 kg, and an entire fuel cell system including electronics, cooling-liquid pump, primary heat exchanger and valve weighs in the order of 40-45 kg.

The invention claimed is:

1. A fuel cell system, comprising:
    a fuel cell (2);
    a liquid fuel supply (3) for providing liquid fuel;
    an evaporator (6) configured for evaporating the liquid fuel to fuel vapor and an upstream liquid-conduit (5A) to the liquid fuel supply (3) for receiving the liquid fuel from the liquid fuel supply (3) by the evaporator (6);
    a reformer (7) for catalytic conversion of the fuel vapor to syngas; a vapor-conduit (5B) for providing the fuel vapor from the evaporator (6) to the reformer (8); a syngas-conduit (5C) from the reformer (7) to the fuel cell (2) for providing syngas from the reformer (8) to the fuel cell (2);
    a burner (8') configured for catalytic burning of fuel vapor or rest gas from the fuel cell (2) and for providing heated exhaust gas from the burning; the burner (8') having a gas exhaust for exhaust of burned gas, wherein the gas exhaust is in flow-communication with the reformer (7) through an exhaust gas flow path (33) for heating the reformer (7) by the exhaust gas.

2. The fuel cell system according to claim 1, wherein the burner (8') comprise a catalytic monolith (21) which is arranged in extension and down-stream of a mixing chamber (31) in which air is mixed with evaporated fuel or rest gas prior to entering the monolith (21); wherein the mixing chamber (31) is surrounded by a sleeve (23), which comprises a plurality of openings (29A, 29B) around the mixing chamber (31) for supply of fuel vapor through the openings (29A, 29B) in the startup phase and for supply of rest gas through the openings (29A, 29B) during normal operation.

3. The fuel cell system according to claim 2, wherein the fuel cell system is configured for supply of fuel vapor through the openings (29A, 29B) only in the startup phase.

4. The fuel cell system according to claim 2, wherein the fuel cell system is configured for supply of rest gas through the openings (29A, 29B) only during normal operation.

5. The fuel cell system according to claim 2, wherein the openings (29A, 29B) are arranged as a first and a second set of openings (29A, 29B), each set (29A, 29B) being distributed in a plane perpendicular to a longitudinal axis of the sleeve (23), where the plane of the first set of openings (29A) has a distance to the plane of the second set of openings (29B), wherein the system is configured for transport of fuel vapor into the mixing chamber (31) only through the first set of openings (29A) and transport of rest gas into the mixing chamber (31) only through the second set of openings (29B).

6. The fuel cell system according to claim 5, wherein for adjustment of the mass flow during start-up phase as compared to the normal operation of the fuel cell (1), the number or size of the openings in the first set of openings (29A) is different from the number or size of openings in the second set of openings (29B).

7. The fuel cell system according to claim 2, wherein the openings (29A, 29B) are not extending through the sleeve perpendicularly to the sleeve surface but are inclined in a direction towards the monolith (21) for creating a flow of the rest gas or the fuel vapor towards to the monolith.

8. The fuel cell system according to claim 1, wherein the fuel cell system comprises en exhaust gas heat exchanger (17) in the exhaust gas flow path (33) between the burner (8') and the reformer (7) for reduction of the temperature of the exhaust gas upstream of the reformer (7).

9. The fuel cell system according to claim 8, further comprising a primary cooling circuit (9A) for cooling the fuel cell (2) by cooling-liquid from the primary cooling circuit (9A), the primary cooling circuit (9A) comprising a primary heat exchanger (11) configured for cooling of the cooling-liquid prior to entering the fuel cell (2) during normal operation of the fuel cell (2); the fuel cell system (1) further comprising a secondary cooling circuit (9B) through the exhaust gas heat exchanger (17) for transfer of heat from the exhaust gas to cooling liquid in the secondary cooling circuit (9B) during start-up of the fuel cell (2); wherein the primary cooling circuit (9A) and the secondary cooling circuit (9B) are either
    a) in thermal connection with each other through a secondary heat exchanger (11B) for transfer of thermal energy from the second cooling circuit (9B) to the first cooling circuit (9A) during start-up of the fuel cell system (1); or
    b) in flow-connection with each other and sharing cooling liquid for flow of cooling liquid through the exhaust gas heat exchanger (17) and then through the fuel cell (2) for receiving thermal energy from the exhaust gas and giving thermal energy to the fuel cell '(2) during start-up of the fuel cell system (1).

10. The fuel cell system according to claim 1, wherein the burner (8') and the exhaust gas heat exchanger (17) are provided in abutment with each other to form a compact burner module (8).

11. A method of operating a fuel cell system according to claim 1, the system comprising
    a fuel cell (2);
    a liquid fuel supply (3) for providing liquid fuel;
    an evaporator (6) configured for evaporating the liquid fuel to fuel vapor and an upstream liquid-conduit (5A) to the liquid fuel supply (3) for receiving the liquid fuel by the evaporator (6);
    a reformer (7) for catalytic conversion of the fuel vapor to syngas; a vapor-conduit (5B) for providing the fuel vapor from the evaporator (6) to the reformer (8); a syngas-conduit (5C) from the reformer (7) to the fuel cell (2) for providing syngas from the reformer (8) to the fuel cell (2);
    a burner (8') configured for catalytic burning of fuel vapor or rest gas from the fuel cell (2) and for providing heated exhaust gas from the burning; the burner (8') having a gas exhaust for exhaust of burned gas, wherein the gas exhaust is in flow-communication with the reformer (7) through an exhaust gas flow path (33) for heating the reformer (7) by the exhaust gas;
    wherein the method comprises receiving liquid fuel by the evaporator (6) and evaporating the liquid fuel to fuel vapor by the evaporator (6), providing the fuel vapor to the reformer (8) and catalytically converting the fuel vapor to syngas by the reformer (8); providing the syngas to the fuel cell (2); by the burner (8') catalytically burning the fuel vapor during startup phase and catalytically burning rest gas from the fuel cell (2) during normal operation and providing heated exhaust gas from the burner (8') to the reformer (7) for heating the reformer (7) by the exhaust gas.

12. The method according to claim 11, wherein the burner (8') comprise a catalytic monolith (21) which is arranged in extension and down-stream of a mixing chamber (31) in which air is mixed with evaporated fuel or rest gas prior to entering the monolith (21);

wherein the mixing chamber (31) is surrounded by a sleeve (23), which comprises a plurality of openings (29A, 29B) around the mixing chamber (31), wherein the method comprises supplying fuel vapor through the openings (29A, 29B) in the startup phase and supplying rest gas through the openings (29A, 29B) during normal operation.

13. The method according to claim 12, wherein the method comprises supplying fuel vapor through the openings (29A, 29B) only in the startup phase.

14. The method according to claim 12, wherein the fuel cell system is configured for supply of rest gas through the openings (29A, 29B) only during normal operation.

15. The method according to claim 12, wherein the openings (29A, 29B) are arranged as a first and a second set of openings (29A, 29B), each set (29A, 29B) being distributed in a plane perpendicular to a longitudinal axis of the sleeve (23), where the plane of the first set of openings (29A) has a distance to the plane of the second set of openings (29B), wherein the system is configured for transport of fuel vapor into the mixing chamber (31) only through the first set of openings (29A) and transport of rest gas into the mixing chamber (31) only through the second set of openings (29B), wherein the method comprises transporting fuel vapor into the mixing chamber (31) only through the first set of openings (29A) and transporting rest gas into the mixing chamber (31) only through the second set of openings (29B).

16. The method according to claim 12, the fuel cell system comprises en exhaust gas heat exchanger (17) in the exhaust gas flow path (33) between the burner (8') and the reformer (7), and wherein the method comprises reducing the temperature of the exhaust gas by the exhaust gas heat exchanger (17) upstream of the reformer (7).

17. The method according to claim 16, wherein during start-up condition of the fuel cell system, the method comprises providing evaporated fuel to the burner (8') and burning the fuel vapour for providing exhaust gas and transferring thermal energy in the exhaust gas heat exchanger (17) from the exhaust gas to cooling liquid and transferring the thermal energy from the cooling liquid to the fuel cell (2) for heating the fuel cell (2) during start-up condition by the thermal energy.

18. The method according to claim 17, wherein the fuel cell system (1) further comprises a primary cooling circuit (9A) for cooling the fuel cell (2) by cooling-liquid from the primary cooling circuit (9A), the primary cooling circuit (9A) comprising a primary heat exchanger (11) configured for cooling of the cooling-liquid prior to entering the fuel cell (2) during normal operation of the fuel cell (2); the fuel cell system (1) further comprising a secondary cooling circuit (9B) through the exhaust gas heat exchanger (17) for transfer of heat from the exhaust gas to cooling liquid in the secondary cooling circuit (9B) during start-up of the fuel cell (2); wherein the primary cooling circuit (9A) and the secondary cooling circuit (9B) are in flow-connection with each other and sharing cooling liquid and the method comprises flow of cooling liquid through the exhaust gas heat exchanger (17) and then through the fuel cell (2) for receiving thermal energy from the exhaust gas and giving thermal energy to the fuel cell '(2) during start-up of the fuel cell system (1).

19. The method according to claim 17, wherein the fuel cell system (1) further comprises a primary cooling circuit (9A) for cooling the fuel cell (2) by cooling-liquid from the primary cooling circuit (9A), the primary cooling circuit (9A) comprising a primary heat exchanger (11) configured for cooling of the cooling-liquid prior to entering the fuel cell (2) during normal operation of the fuel cell (2); the fuel cell system (1) further comprising a secondary cooling circuit (9B) through the exhaust gas heat exchanger (17) for transfer of heat from the exhaust gas to cooling liquid in the secondary cooling circuit (9B) during start-up of the fuel cell (2); wherein the primary cooling circuit (9A) and the secondary cooling circuit (9B) are in thermal connection with each other through a secondary heat exchanger (11B) and the method comprises transferring thermal energy from the second cooling circuit (9B) to the first cooling circuit (9A) during start-up of the fuel cell system (1).

20. The method according to claim 16, wherein the fuel cell is a high temperature PEM fuel cell and the method comprises operating the fuel cell at a temperature in the range of 120-200 degrees centigrade.

* * * * *